UNITED STATES PATENT OFFICE.

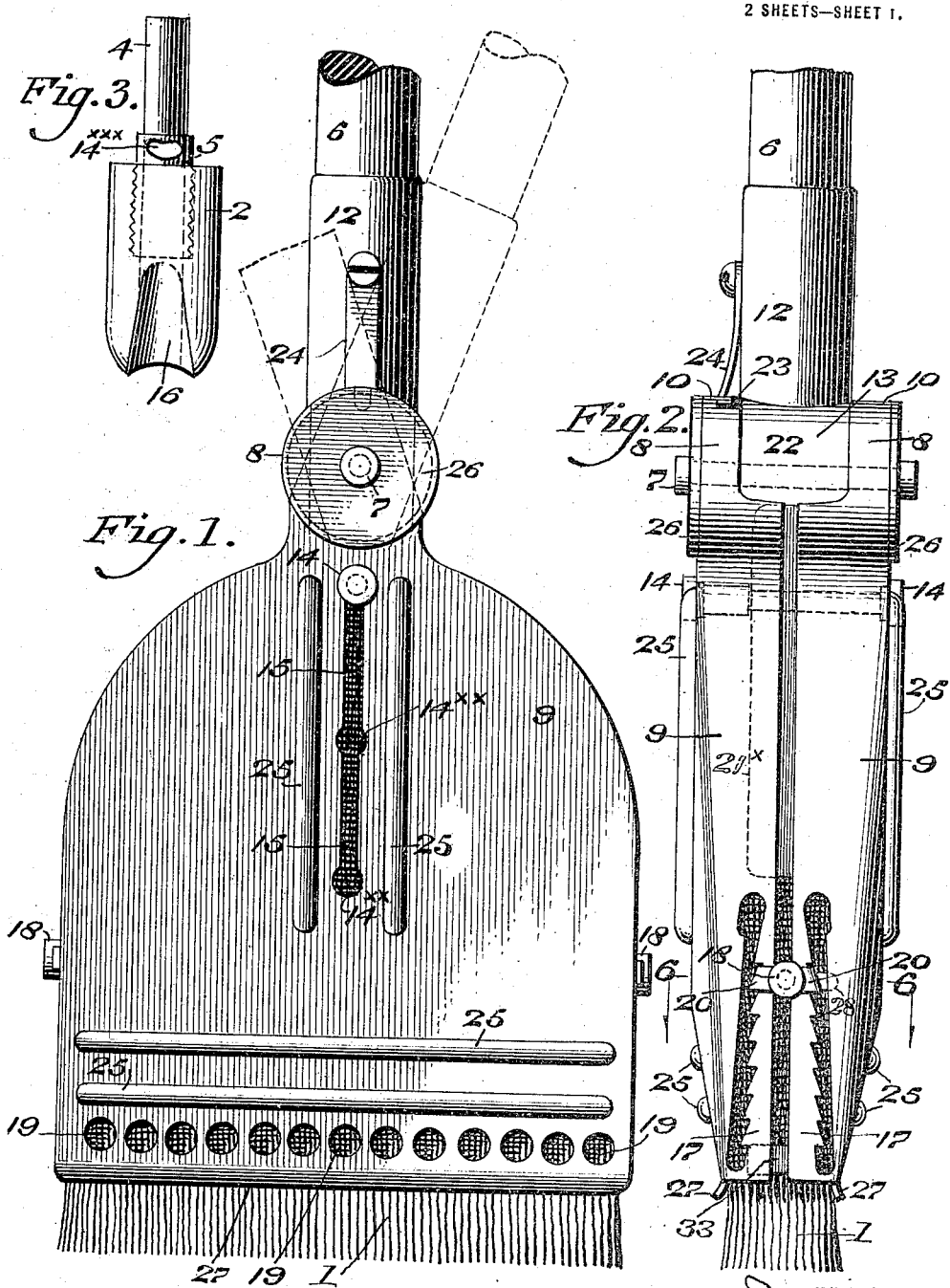

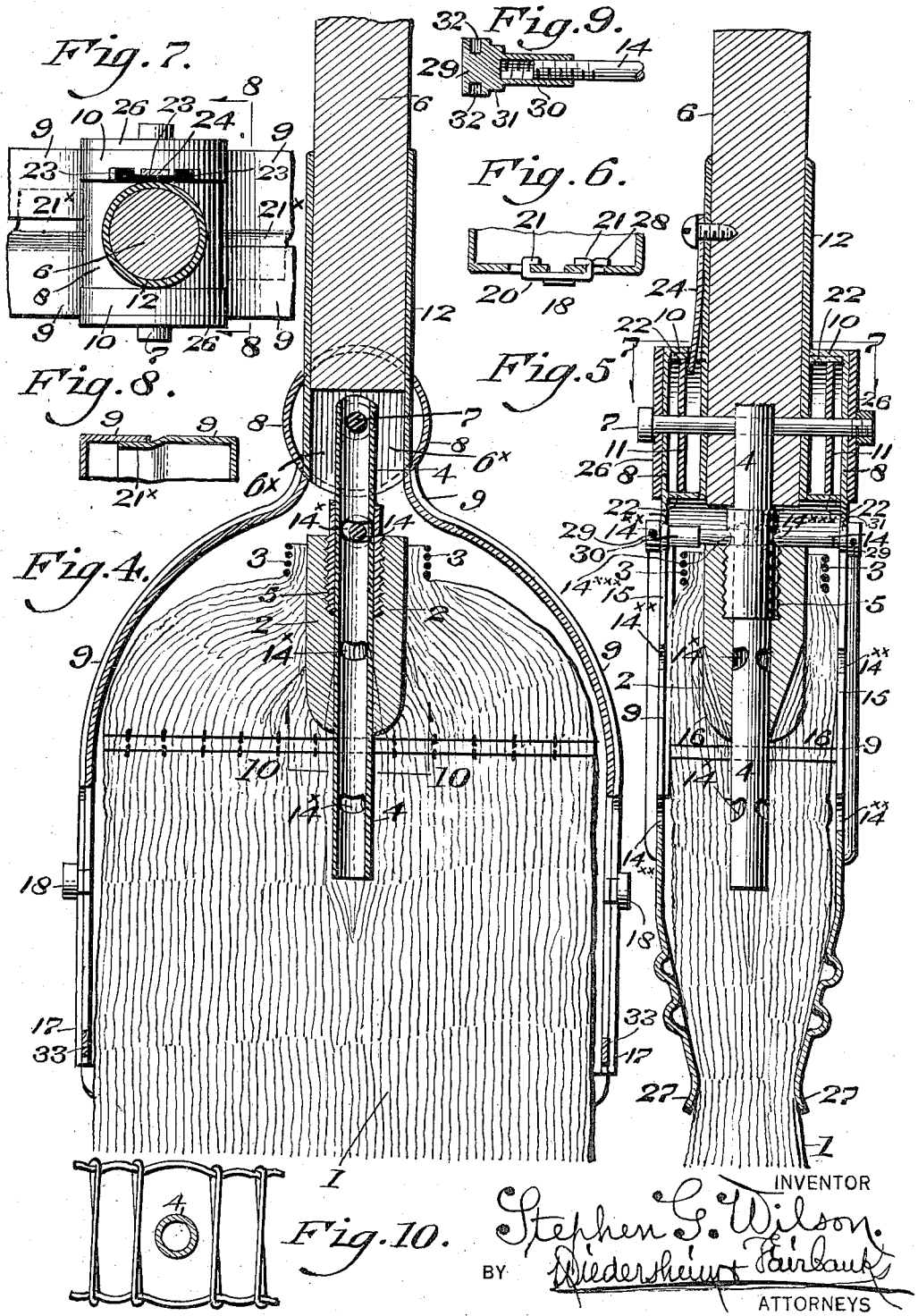

STEPHEN G. WILSON, OF PHILADELPHIA, PENNSYLVANIA.

BROOM-HEAD.

1,294,739. Specification of Letters Patent. Patented Feb. 18, 1919.

Application filed May 8, 1917, Serial No. 167,157. Renewed January 9, 1919. Serial No. 270,439.

*To all whom it may concern:*

Be it known that I, STEPHEN G. WILSON, a citizen of the United States, residing in the city and county of Philadelphia, State of Pennsylvania, have invented a new and useful Broom-Head, of which the following is a specification.

My invention consists of an improvement in brooms embodying means whereby when the body of a broom is worn, it is adapted to have a fresh surface presented to a place of service, clamps for said body adapted to tightly embrace the same, mountings for the handle proper whereby the latter may be placed at various inclinations, means for supporting various members of the device, and other novel details as will be hereinafter set forth.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figures 1 and 2 represent side elevations at a right angle to each other of a broom embodying my invention.

Fig. 3 represents a side elevation of a detached member thereof.

Figs. 4 and 5 represent longitudinal sections thereof at a right angle to each other.

Fig. 6 represents a transverse section on line 6—6 Fig. 2.

Fig. 7 represents a top or plan view of a portion showing also the stick or handle in section.

Fig. 8 represents a transverse section of a portion on line 8—8 Fig. 7.

Fig. 9 represents a partial section and partial side elevation of one of the bolts employed.

Fig. 10 represents a section of a portion on line 10—10 Fig. 4.

Similar numerals of reference indicate corresponding parts in the figures.

Referring to the drawings:—

1 designates a portion of a broom in the head end of which is the stub handle 2 tightly held in position by the wire 3 or other suitable means, said handle being composed of a cylindrical block of wood or other material having therein a vertically-extending bore through which is passed the tube 4 whose lower portion extends into the material of the broom, said tube being encircled in part by the threaded sleeve 5 which is screwed in said bore and so connected with said handle 2.

The upper end of said tube enters the lower portion of the broom handle proper 6, and is connected therewith by the king bolt 7 which is passed transversely through said handle 6, and said tube, and the sectional hollow collar 8 whose side members have connected with them the clamps 9 which depend therefrom and are adapted to be fitted against opposite sides of the broom head 1.

The sides of the sections of the collar 8 join the peripheral walls 10 thereof which walls are sustained firmly on rings formed of disks 11 which are within said collar sections, it being noticed that the bolt 7 passes through the collar sections 8 and said disks 11, thus connecting the handle with the tube 4 and consequently with the broom 1, said bolt also forming an axis for the handle 6 whereby the latter is adapted to be inclined when so required to the right or left, as shown by the dotted lines Fig. 1.

The lower end of the handle is inserted in the socket 12 which is secured to the peripheral walls of the sectional collar 8, it being noticed that the lower portions of the sides of the latter are cut away forming the recesses 13, see Fig. 2, for the play of the lower end of the socket 12 in inclining the same and the handle 8 therewith.

The clamps 9 consist of plates of metal or other suitable material adapted to embrace opposite adjacent portions of the broom 1, they being connected with the latter by means of a bolt 14 which is passed through openings $14^{x}$ in said plates, and through registering openings $14^{xxx}$ in the sleeve 5, it being noticed that in the plates of the clamps 9 are the longitudinal slots 15 and recesses $14^{xx}$ are formed in the walls of said openings whereby when the broom wears off the bolt 14 will be loosened when the broom may be lowered to present a fresh surface to the work, the stub handle 2 and sleeve 5 following the same.

Attention is directed to Fig. 9 where the bolt 14 is shown as fitted in the interiorly threaded sleeve 30, the latter having on its outer end the head 29 and the reduced neck 31. The other end of said bolt is fitted in a similar head 29 and neck 31, as shown at the right side of Fig. 5, hence when the bolt is loosened it may be lowered, and when the necks reach the recesses 14ˣˣ, said necks enter the latter and the head 29 is properly turned tightening the necks in said recesses and so holding the bolt in position tightening the clamps on the broom corn or material as before.

In the periphery of the head 29 are recesses 32 which may receive a broom hanger or other implement for the convenient rotation of said head and consequently of the sleeve 30.

The side of the stub handle is cut-away forming the recesses 16, into which the broom corn or material may enter and so engage said handle so as to prevent said handle from becoming bare of said material, when sewing is done close to its end. The lower portions of the clamps 9 are slotted vertically so as to form therein the jaws 17 which are serrated and increase in width in downward direction, the serrations or teeth being adapted to be engaged by the vertically slidable or movable dogs 18, the side terminals of which are adapted to play in the slots, see Fig. 2, whereby said jaws may be brought together so as to close the adjacent portions of the clamps on the broom and cause said clamps to be tightened on said broom and compress the same, it being noticed that as the clamps are separated and their lower portions are formed with openings 19 therein, said portions are made more resilient in their nature and so may be moved in by the action of the dogs 18, the latter being formed of bars 20 with inturned lips 21, and a lip 28 outturned from one of the latter to engage the backs of the respective clamps 9, whereby the dogs remain in position on the jaws 17 after being moved over the teeth thereof.

One of the clamps is formed on its inner sides with a tongue 21ˣ which is overlapped by the other clamp, as shown in dotted lines Fig. 2, and in section in Fig. 8, whereby said clamps retain their positions one on the other, and the joint thereat is in closed condition.

The lower ends of the plate 9 has each therein laterally projecting lips 33 which underlap the opposite plate, see Fig. 2, whereby the broomcorn or material is prevented from bulging out or escaping at said ends.

The peripheral walls 10 of the sectional collars 8 rest on the peripheral wall 22 of the disks 11, see Figs. 2 and 5 and are directly sustained by the same and the collars are accordingly strengthened.

In said walls 10 are a number of recesses 23 side by side which are adapted to receive the end portion of the spring tongue or latch 24 which latter is secured at its upper end to the socket 12, it being seen that when the tongue is pressed in and the handle 6 inclined in either direction its end portion may spring into either of said recesses 23, and thus the handle is held in the position to which it may be inclined.

The clamps 9 have on their sides the knurls or beads 25 for strengthening the same, as is evident.

On the exterior of the collar members 8 are the washers 26 which receive the end portions of the bolt 7 for evident purposes.

In Fig. 10 is shown the manner of stitching through the broom head so that the stitches clear the tube 4 in passing through the corn or material of said head.

The lower ends of the clamps 9 are formed with lips 27 which are outturned and adapted to form a tension of said ends on the broom head and prevent cutting of the broom material thereof.

The openings in the tube 4 and sleeve 5 are somewhat elongated so as to admit of the bolt 14 being readily guided into said openings and passed through the same.

The handle is adapted to be placed at an inclination to the broom head, so as to keep the broom material in even contact on a straight line with the floor, and prevent said material from wearing all at one side of the broom. For this purpose, referring to Fig. 4, the lower portion of the broom stick 6 has therein the vertically-extending slot 6ˣ which permits said portion to pass freely the upper end of the tube 4 as the broom handle is moved to inclined positions, the latter being shown in dotted lines Fig. 1, the effect which is evident.

Having thus described my invention what I claim as new and desire to secure by Letters Patent, is:—

1. A broom head having separated slotted side plates adapted to clamp the sides of the body of a broom, jaws integral with said plates, and means bridging the space between said jaws and retained on said plates and having inturned lips at the ends movable in said slots and coöperating with said jaws to draw the same together and to compress and clamp the broom head.

2. A broom head having plates separable at their lower ends and adapted to clamp the sides of the body of the broom and provided with tapering jaws integral therewith and having longitudinally disposed slots, and sliding means movable on said jaws and coöperating with said slots to close said plates tightly against the body of the broom.

3. A clamp for the side of a broom head composed of resilient plates, means for connecting the same, said plates being longitudinally slotted, the edges of the slots forming serrated jaws, and a member adapted to engage said jaws to draw them together to tighten the clamping plates on the broom head.

4. In a broom head, a divided handle composed of a handle portion proper, and a stub portion, a sleeve within said stub portion, a tubular member adapted to be connected with the handle proper, and pass through said sleeve and stub handle into said broom head, a bolt for connecting said tubular member with said head proper, and means coöperating with said bolt for adjustably connecting said stub handle with said tubular member adapting the broom head when worn to present a fresh surface for brushing.

5. In a broom head, plates adapted to clamp the side of said head, a collar on the upper ends of said plates, a handle adapted to enter said collar, a tubular member in said handle and broom head, and a bolt adapted to pass through said collar handle, and stay rings, said tubular member serving to connect the broom head with the handle and form an axis for the latter allowing said handle to be placed at an inclination to the broom head and keep the broom corn in even contact on a straight line with the floor and prevent the broom corn wearing all at one side of the broom.

6. In a broom head, plates adapted to clamp the side of said head, a bolt for securing said plate to said head, a collar on the top of said plates, a handle adapted to enter said collar, means for connecting said collar with said handle, means for connecting the latter with said broom head, and means within said collar for sustaining and strengthening the latter.

7. In a broom head, plates separable at their lower ends and adapted to clamp opposite sides thereof, means for connecting said plates with the handle of a broom, slidable means coöperating with said plates for tightening said plates on the broom, and overlapping members above and below on said plates adapted to cover the joint of the latter, and keep the broom material in place.

8. In a broom head, a collar, plates depending from the latter adapted to clamp the side portions of a broom, a handle, a tubular member adapted to enter the latter and the broom, a bolt adapted to pass through said handle and the end portion of said tubular member therein, and a bolt adapted to pass through said clamp-plates and tubular member, the latter having a series of openings therein to receive the last named bolt to admit of adjustment of the broom as its working surface wears away.

9. In a broom head, a divided handle composed of a handle proper, a stub portion in said head, and a tubular member connectible with said handle proper and head, said tubular member being adapted to have said stub portion slidable thereon, adapting the broom head when worn to be moved down to present a fresh surface for brushing.

10. A clamp for a broom head comprising a plate having integral therewith serrated jaws, and a member slidable between said jaws and adapted to engage the teeth of said jaws, said member having thereon an auxiliary lip adapted to retain the same in operative connection with said jaws.

11. A clamp for a broom head having therein longitudinally extending slots with oppositely disposed recesses, a bolt movable in said slot, and heads adjustable on said bolt and having reduced necks for coöperation with said recesses.

12. A broom head, clamps on opposite portions thereof, a tubular member and sleeve in said head and longitudinally adjustable within the head, and a securing bolt adapted to connect said clamps, member, sleeve, and head, said sleeve and member having therein openings to receive said bolt, said openings being of elongated form.

13. In a broom, plates adapted to embrace opposite sides of the body of the broom material and provided with longitudinally extending slots to receive clamping means, and means on said plates for closing the latter tightly on said body, the lower portions of said plates having therein a series of openings providing for increased resiliency of said plates.

14. In a broom, plates adapted to embrace opposite sides of the body of the broom material, and means movable in the direction of and on said plates for closing the latter tightly on said body, the lower terminals of said plates having thereon outturned lips.

STEPHEN G. WILSON.

Witnesses:
JOHN A. WIEDERSHEIM,
N. BUSSINGER.